Oct. 31, 1961 O. L. HENRY 3,006,725
PROCESS FOR RECOVERING AMMONIA AS A SALT FROM COKE OVEN GAS
Filed Feb. 21, 1957
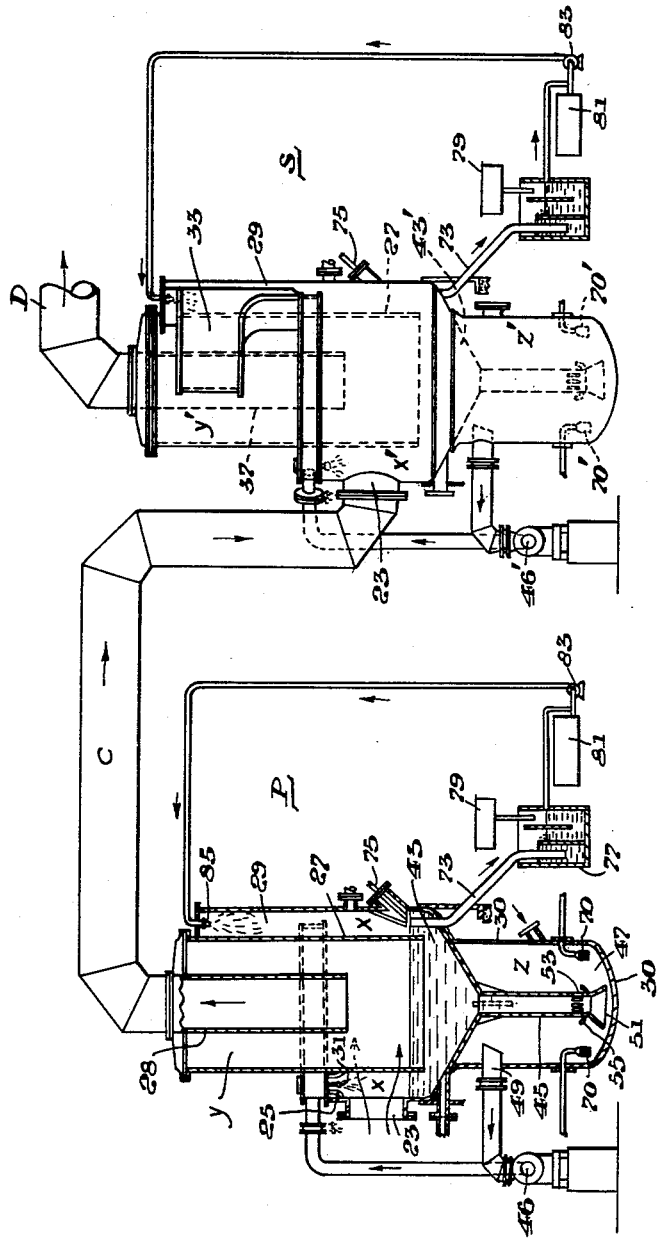
INVENTOR.
ORMOND L. HENRY
BY
Oscar B Brumback
his ATTORNEY

United States Patent Office 3,006,725
Patented Oct. 31, 1961

3,006,725
PROCESS FOR RECOVERING AMMONIA AS A SALT FROM COKE OVEN GAS
Ormond L. Henry, Allison Park, Pa., assignor to Koppers Company, Inc., a corporation of Delaware
Filed Feb. 21, 1957, Ser. No. 641,594
3 Claims. (Cl. 23—107)

This invention relates generally to the recovery of the ammonia from coke oven gas as the salts of inorganic acids.

The ammonia constituent of coke oven gas is conventionally recovered as ammonium sulfate by scrubbing the gas with a dilute solution of sulfuric acid. The ammonium sulfate is then crystallized out of the solution, and the crystals dried and sold as fertilizer. However, due to recent declines in both the price and consumption of ammonium sulfate, consideration has been given to the recovery of the ammonia as a phosphate for use as a fertilizer. Diammonium phosphate is the desired product of this recovery as it has a nitrogen content of 21.2% and a $P_2O_5$ content of 53.8%. Monoammonium phosphate has a nitrogen content that is too low to make the compound desirable for fertilizer. Difficulties have been experienced heretofore in recovering the ammonia from coke oven gas as crystals of diammonium phosphate, however, because the pH value of the absorbent solution must be controlled within a narrow range at nearly the neutral point, that is from 6.5 to 7, in order to obtain crystals of diammonium phosphate. If the pH be allowed to drop below this range, large quantities of monoammonium phosphate may be precipitated; and when operating within this range, ammonia losses of 5 to 10% or more of the original ammonia content of the gas are encountered. In contrast, the concentration of sulfuric acid in the solution in the conventional production of ammonium sulfate can vary from 2–8% without materially affecting the recovery of ammonia or the production of ammonium sulfate.

The equilibrium value of the vapor pressure of ammonia over a saturated solution of diammonium phosphate at the pH required for the production of diammonium phosphate is high so that even with careful control of the pH value of the solution, 5 to 15% of the ammonia in the coke oven gas passes out of the saturator with the gas and is not recovered. Because of the high pH value required to produce diammonium phosphate, there is also almost a complete loss of other valuable alkaline constituents, such as pyridine, in the coke oven gas. If 5 to 15% of the ammonia is left in the gas, serious operating problems may occur in the subsequent gas processing and chemical recovery equipment, atmospheric pollution may result from liberation of ammonia and hydrogen sulfide and hydrogen cyanide in cooling towers for recirculated cooling water for direct type final coolers, and corrosion problems may result in the heat exchangers in the light oil recovery system.

An object of the present invention, therefore, is to provide a novel arrangement for recovering, as crystals of diammonium phosphate, the major portion of the ammonia from coke oven gas and subsequently recovering, as crystals of ammonium sulfate, the minor portion of ammonia which is not recovered as diammonium phosphate.

Another object of the invention is to provide a novel arrangement for passing coke oven gas through a first absorber provided with phosphoric acid to obtain diammonium phosphate and subsequently passing the gas through a second absorber provided with sulfuric acid to recover the residual ammonia as ammonium sulfate and also to recover the pyridine from the gas.

The present invention contemplates a system for the by-product recovery of ammonia from coke oven gas wherein the coke oven gas is passed through a series of first and second absorbers for the production of diammonium phosphate in the first absorber and for the production of ammonium sulfate in the second absorber. The use of sulfuric acid in the second absorber makes it possible to operate the first absorber at a sufficiently high pH for a major portion of the ammonia to be converted to crystals of diammonium phosphate in the first absorber and for the residual ammonia to be recovered in the second absorber without an overall loss of ammonia. A further advantage is that since the ratio of phosphorus to nitrogen content is higher in the diammonium phosphate than is normally desired in fertilizer and since the nitrogen content of diammonium phosphate and ammonium sulfate is substantially the same, the crystals of the diammonium phosphate and the ammonium sulfate may be blended, after the crystals are dried, to reduce this phosphate ratio and provide a fertilizer balanced to a desired phosphate to nitrogen ratio.

The above and further objects and novel features of the invention will appear more fully from the detailed description when the same is read in connection with the accompanying drawing. It is to be expressly understood, however, that the drawing is not intended as a definition of the invention but is for the purposes of illustration only.

The single sheet of drawing schematically illustrates apparatus for carrying out the present invention.

Turning now to the drawing, the apparatus for carrying out the invention is illustrated as comprised of a pair of saturators P and S connected by a conduit C for the passage of the coke oven gas in series therethrough. These saturators may be identical in structure and may advantageously use crystal-producing apparatus of the type described in Van Ackeren Patent No. 2,671,011. For purposes of illustration, the saturator P of the systems is illustrated as a sectional view.

As described in detail in the afore-mentioned Van Ackeren Patent No. 2,671,011, each saturator comprises an absorption zone X, a mist eliminator Y, and a crystallizer Z. The space between the outer shell 25 of the saturator and an inner member 27 constitutes the absorption zone X, the space between member 27 and an inner pipe or flue 28 constitutes the mist eliminator Y, and the space enclosed by shell 30 constitutes the crystallizer Z.

In each saturator P and S, the coke oven gas is supplied to inlet 23 and flows through absorption zone 25 and around member 27 to the lower end of riser 29 by way of two parallel paths; one path of flow being in a clockwise direction around member 27 and the other path being in a counterclockwise direction. The flow through these paths is extremely turbulent because of the relatively high rate of flow and because of the constantly changing path of flow due to the curvature of the absorption zone. The gas in the absorption chamber is in contact with liquid sprayed from nozzles 31 that are uniformly distributed over the entire length of absorption zone 25. Nozzles 31 provide a dense spray that completely fills the absorption zone, thereby bringing the liquid into intimate contact with the coke oven gas.

After the gas reaches the lower end of riser 29, the gas flows up the riser and through horizontal passage 33 (shown in saturator S) to discharge tangentially, at a high velocity, into chamber Y between member 27 and pipe 28. As a result, the gas spirals within this chamber and around pipe 28 at a high rate of speed. Any liquid which is entrained by the gas in chamber Y is hurled against the walls of member 27 by centrifugal force and drains down the walls into the bath below.

Although the gas loses it angular velocity as it moves downwardly in the chamber and turns to flow upwardly through pipe 28, the gas is substantially free of entrained liquid by the time the gas reaches pipe 28. Thus, the solution of saturator P is separated or isolated from the solution in saturator S.

The liquid or solution sprayed into the absorption zone X by nozzles 31 is in a substantially saturated condition as it leaves the nozzles; and through its intimate contact with the gas in zone 25, the solution reaches a supersaturated condition due to the absorption of ammonia from the gas. The sprayed liquid is collected at the lower portion 43 of the absorption zone 25 and, as supersaturated liquid, is continuously flowed by way of pipe 45 into a crystallizer bowl. The supersaturation of the liquid is released (or the liquid is desupersaturated) in the crystallizer as it contacts previously formed crystals therein; and the substantially saturated liquid which remains is removed from crystallizer Z by way of suction head 49 and returned to sprays 31 by way of pump 46.

A major portion of the liquid, which flows through pipe 45 into the crystallizer Z discharges through the lower end 51 of the pipe; and minor portion of the liquid discharges through the openings 53 in the pipe. While the major portion impinges on the bottom of the crystallizer and flows radially outwardly and upwardly in the regions adjacent the wall of the crystallizer, the deflectors 55 cause the minor portion to flow radially upwardly in the region adjacent the pipe. The upward flow of this minor portion in the central part of crystallizer Z prevents the major portion from flowing along the outer walls of the crystallizer and then flowing downwardly along pipe 45. Thus, at any given level in the crystallizer, the movement of the liquid is upwardly at a substantially uniform rate.

When the liquid, which is discharged from the pipe 45 into the lower portion of crystallizer Z contacts the crystals that are held in suspension in the bottom portion of the crystallizer, the supersaturation of the liquid is released (i.e., the liquid is desupersaturated). The excess ammonium sulfate is deposited on these crystals; and as a result, the crystals grow in size until they settle to the lower portion of the bowl where they are removed through the suction heads 70. Since the upward flow of the liquid is substantially uniform throughout any given area of the crystallizer, the crystals settling to the lower part of the crystallizer are of substantially uniform size.

An overflow 73 in the liquid collection portion 43 of the saturator maintains the solution at a level high enough to seal the mist eliminator zone Y from the absorption zone X. A pipe 75 is provided to flush the overflow pipe with water to prevent clogging of the pipe. Overflow 73 communicates with a conventional tar skimmer tank 77. In accordance with the present invention, fresh or make-up acid is added from a suitable storage tank 79. The overflow from the tar skimmer is conducted to a mother liquor storage tank 81 and by way of pump 83 to a spray unit 85.

In the practice of the present invention, the solution in portion 43 of crystallizer Z of saturator P is saturated or supersaturated with respect to its content of diammonium phosphate and contains free phosphoric acid to the extent that the solution is maintained at a pH value of 6.5–7. The pump 46 forces the solution from nozzles 49 to spray nozzles 31 where the solution is sprayed into absorber X in contact with the gas passing therethrough from inlet 23 to riser 29. The liquid becomes supersaturated with diammonium phosphate as a result of absorption of the ammonia from the gas. The liquid collects at portion 43 and flows through pipe 45 into the crystallizer Z where the supersaturation of the liquid is released by contact with previously formed crystals of diammonium phosphate. The excess diammonium phosphate is deposited on these crystals; and as the crystals gravitate toward the bottom against the upward flow of liquid, they are removed through suction nozzles 70 and sent to a conventional centrifuge and dryer (not shown).

On the other hand, the gas, which has passed through absorber X, reaches riser 29, and discharges through horizontal duct 33 in the mist eliminator Y tangentially at high velocity. The gas spirals downwardly within the mist eliminator, and any liquid entrained in the gas is hurled against wall member 27 and drained to bath portion 43. The gas passes upwardly then through pipe 28 to duct C; but by the time the gas enters pipe 28, it is substantially free of entrained liquid.

The gas which flows through duct C still contains a substantial proportion of ammonia, and in accordance with the present invention is applied to inlet 23 of saturator S. The gas enters absorber X of saturator S and is brought into intimate contact with the solution sprayed from spray nozzles 31. In saturator S, the solution to sprays 31 is pumped by pump 46 from nozzles 49 and is a solution saturated with respect to its content of ammonium sulfate and containing 2–8% free sulfuric acid. As the sprayed solution removes the ammonia from the gas in absorber X, the solution becomes supersaturated with respect to its content of ammonium sulfate. The solution is collected at portion 43 of the absorber and, by way of pipe 45, conducted to crystallizer Z where the supersaturation is released upon contact of the solution with previously formed crystals of ammonium sulfate. The excess ammonium sulfate from the supersaturated solution is deposited on the previously formed crystals; and as the crystals gravitate to the bottom of the crystallizer against the upward flow of liquid, the crystals are removed through nozzles 70 and sent to a centrifuge and dryer (not shown).

The gas, in flowing through absorber X of saturator S, has had the ammonia constituent substantially completely removed therefrom. After this gas reaches riser 29, it flows upwardly in riser 29 and discharges through horizontal member 33 into the mist separator tangentially at high velocity. The gas spirals within the mist separator and any entrained liquid is hurled against the walls of member 27 and drained into the bath of portion 43. The gas exits from the saturator S at pipe 28; but by the time the gas enters pipe 28, it is substantially free of an entrained solution. The gas which leaves saturator S at duct D, therefore, is substantially free of ammonia and acid.

After the crystals of diammonium phosphate and ammonium sulfate have been dried, these crystals may be mixed or blended to give a desired nitrogen to phosphorus ratio since the diammonium phosphate and ammonium sulfate have the same percentage of nitrogen.

By control of the pH value of the saturator in which the diammonium phosphate is formed, it is possible to control the amount of ammonia absorbed therein. Thus, the pH value of the phosphoric acid may be raised so that little ammonia is absorbed therein and may be lowered as discussed above so that 85–95% of the ammonia is recovered therein. In any event, the ammonia not recovered as diammonium phosphate is recovered as ammonium sulfate. Thus, the conditions of the saturators may be adjusted to produce a desired quantity of ammonium sulfate for a given quantity of diammonium phosphate when the crystals of the two salts are to be blended to provide a particular composition of fertilizer. When the yield of diammonium phosphate per volume of coke oven gas is not an important factor, it may be advantageous to operate the first saturator at a high pH value to reduce the risk of production of monoammonium phosphate and thereby reduce the necessity of close supervision of the operation.

The foregoing has presented a novel process for removing the ammonia from coke oven gas and recovering the ammonia as salts of inorganic acids. The ammonia is substantially removed from the gas in the form of phosphate and sulfate salts which are desirable products as fertilizer. Due to the fact that both the salts contain the same percentage of nitrogen while only one contains phosphorus, the salts may be blended to give an optimum nitrogen to phosphorus ratio for a balanced fertilizer product.

As will be apparent to those skilled in the art, various changes and modifications may be made in the details of the novel process of this invention without departing from the scope of the appending claims.

What is claimed:

1. A process for the recovery of the ammonia from coke oven gas as the salt, diammonium phosphate, and as the salt, ammonium sulfate, which comprises spraying said gas with a first solution which is comprised of free phosphoric acid and diammonium phosphate and which is saturated with respect to its content of diammonium phosphate and has a pH value of 6.5 to 7 to absorb ammonia from said gas so as to form a product consisting essentially of diammonium phosphate crystals, recovering said diammonium phosphate crystals, removing from said gas substantially all of the first solution which may be entrained therein, said gas still containing some residual ammonia because of said first solution being inherently incapable of absorbing all of the ammonia from said gas, thereafter spraying said gas with a second solution which is comprised of free sulfuric acid and ammonium sulfate and which is saturated with respect to its content of ammonium sulfate and has a sulfuric acid content of 2 to 8% to absorb the residual ammonia to form a product consisting essentially of ammonium sulfate crystals, and recovering said ammonium sulfate crystals.

2. A process for recovering the ammonia from coke oven gas for use as a fertilizer which comprises the steps of initially contacting said gas with a first solution comprising diammonium phosphate and free phosphoric acid and which is saturated as to its content of diammonium phosphate and has a phosphoric acid content to give a pH value of 6.5 to 7 so as to be conducive to the formation of diammonium phosphate, whereby a portion of the ammonia in said gas is absorbed and the absorption of ammonia from said gas as diammonium phosphate supersaturates said first solution so that diammonium phosphate crystallizes out, removing the crystals of diammonium phosphate from said solution and drying said crystals, contacting said initially treated gas containing the remaining ammonia with a second solution containing ammonium sulphate and free sulphuric acid and which is saturated as to its content of ammonium sulfate and has a sulfuric acid content of 2 to 8 percent so as to be conducive to the formation of ammonium sulfate, whereby the remaining portion of the ammonia is absorbed from said gas and the absorption of ammonia from said gas as ammonium sulfate supersaturates said second solution so that ammonium sulfate crystallizes out, removing the crystals of ammonium sulfate from said second solution and drying the crystals, and blending said crystals to provide a fertilizer having a desired nitrogen to phosphorus ratio.

3. The process of claim 2 wherein the ratio of formation of diammonium phosphate to ammonium sulfate is controlled by controlling the phosphoric acid content of said first solution.

References Cited in the file of this patent

UNITED STATES PATENTS

| | | |
|---|---|---|
| 773,784 | Brunck | Nov. 1, 1904 |
| 2,033,389 | Moose | Mar. 10, 1936 |
| 2,040,563 | Phillips | May 12, 1936 |
| 2,645,559 | Otto | July 14, 1953 |